US010819920B1

(12) United States Patent
Hamlin et al.

(10) Patent No.: US 10,819,920 B1
(45) Date of Patent: Oct. 27, 2020

(54) AUGMENTED INFORMATION HANDLING SYSTEM USER PRESENCE DETECTION

(71) Applicant: Dell Products L.P., Round Rock, TX (US)

(72) Inventors: Daniel L. Hamlin, Round Rock, TX (US); Timothy C. Shaw, Austin, TX (US); Vivek Viswanathan Iyer, Austin, TX (US); Allen B. McKittrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/419,779

(22) Filed: May 22, 2019

(51) Int. Cl.
*H04N 5/33* (2006.01)
*G06F 1/16* (2006.01)
*G06F 3/0488* (2013.01)
*G06F 3/01* (2006.01)

(52) U.S. Cl.
CPC ............. *H04N 5/33* (2013.01); *G06F 1/1618* (2013.01); *G06F 1/1681* (2013.01); *G06F 1/1686* (2013.01); *G06F 3/013* (2013.01); *G06F 3/017* (2013.01); *G06F 3/04883* (2013.01)

(58) Field of Classification Search
CPC ........ H04N 5/33; H04N 5/332; G06F 1/1618; G06F 1/1681; G06F 1/1686; G06F 3/013; G06F 3/017; G06F 3/04883; B60G 2401/14; B60R 21/01534; G01N 2203/0641; G01N 2223/509
See application file for complete search history.

(56) References Cited

U.S. PATENT DOCUMENTS

| 7,714,265 | B2 | 5/2010 | Fadell et al. |
| 8,363,098 | B2 | 1/2013 | Rosener et al. |
| 8,593,277 | B2 | 11/2013 | Nath et al. |
| 8,760,631 | B2 | 6/2014 | Ritter et al. |
| 9,378,342 | B2 | 6/2016 | Robison et al. |
| 9,672,627 | B1 * | 6/2017 | Ramaswamy .......... G06T 7/292 |
| 2013/0346084 | A1 | 12/2013 | Archambault et al. |
| 2014/0085221 | A1 * | 3/2014 | Kim ..................... G06F 1/3231 345/173 |
| 2014/0215248 | A1 * | 7/2014 | Cheng ................... G06F 1/3234 713/323 |

(Continued)

FOREIGN PATENT DOCUMENTS

| CA | 2838280   | 12/2012 |
| CA | 2838280 C | 12/2012 |

(Continued)

OTHER PUBLICATIONS

Pidgeon, Elana, "Windows 10 Tip: How to Enable Focus Assist in the Windows Apr. 10, 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.

(Continued)

*Primary Examiner* — Alexander Gee
(74) *Attorney, Agent, or Firm* — Zagorin Cave LLP; Robert W. Holland

(57) ABSTRACT

An information handling system transitions security settings and/or visual image presentations based upon a user absence or user presence state detected by an infrared time of flight sensor. An operating system service monitors the state detected by the infrared time of flight sensor and other context at the information handling system to selectively apply the user absence or user presence state at the information handling system.

17 Claims, 11 Drawing Sheets

(56) References Cited

U.S. PATENT DOCUMENTS

| | | | |
|---|---|---|---|
| 2015/0085060 A1* | 3/2015 | Fish | H04N 5/247 348/14.03 |
| 2016/0127765 A1 | 5/2016 | Robinson | |
| 2017/0205876 A1* | 7/2017 | Vidal | G06F 1/163 |
| 2018/0275752 A1* | 9/2018 | Peterson | G06F 3/013 |
| 2018/0321731 A1 | 11/2018 | Alfano et al. | |
| 2019/0034609 A1* | 1/2019 | Yang | G10L 17/005 |

FOREIGN PATENT DOCUMENTS

| | | |
|---|---|---|
| CN | 103347437 | 10/2013 |
| CN | 103347437 B | 10/2013 |
| EP | 2472424 | 7/2012 |

OTHER PUBLICATIONS

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,220, filed Oct. 11, 2019, entitled "Information Handling System Proximity Sensor with Mechanically Adjusted Field of View" to Inventors Daniel L. Hamlin et al.

U.S. Appl. No. 16/599,226, filed Oct. 11, 2019, entitled "Information Handling System Infrared Proximity Detection with Frequency Domain Modulation" to Inventors Daniel L. Hamlin et al.

U.S. Appl. No. 16/599,222, filed Oct. 11, 2019, entitled "Information Handling System Infrared Proximity Detection with Distance Reduction Detection" to Inventors Daniel L. Hamlin et al.

U.S. Appl. No. 16/599,224, filed Oct. 11, 2019, entitled "Information Handling System Infrared Proximity Detection with Ambient Light Management" to Inventors Daniel L. Hamlin.

U.S. Appl. No. 16/778,787, filed Jan. 31, 2020, entitled "Information Handling System Notification Presentation Based Upon User Presence Detection" to Inventors Daniel L. Hamlin et al.

U.S. Appl. No. 16/778,798, filed Jan. 31, 2020, entitled "Information Handling System Peripheral Enhanced User Presence Detection" to Inventors Daniel L. Hamlin et al.

U.S. Appl. No. 16/778,805, filed Jan. 31, 2020, entitled "Information Handling System Adaptive User Presence Detection" to Inventors Daniel L. Hamlin et al.

* cited by examiner

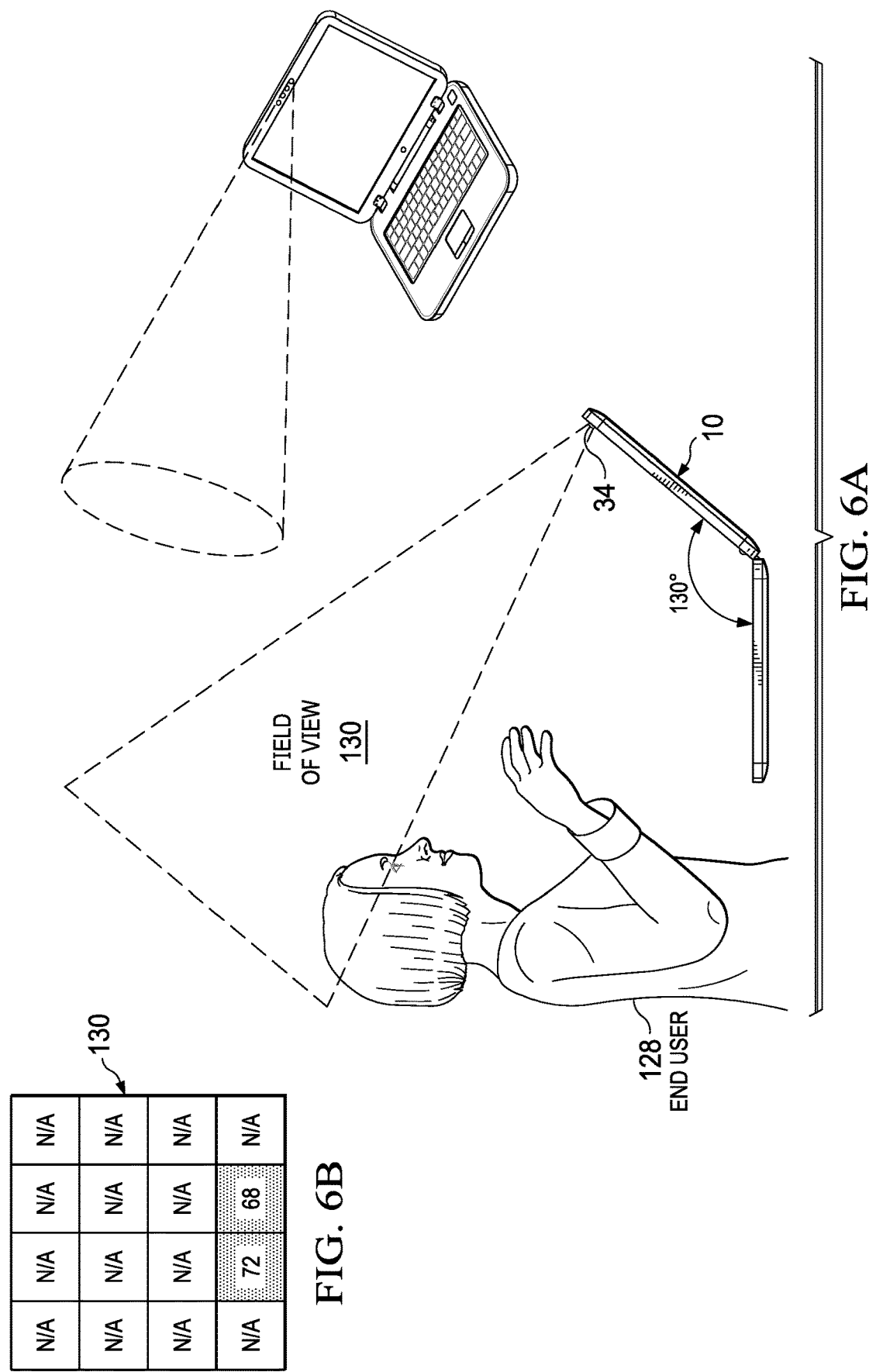

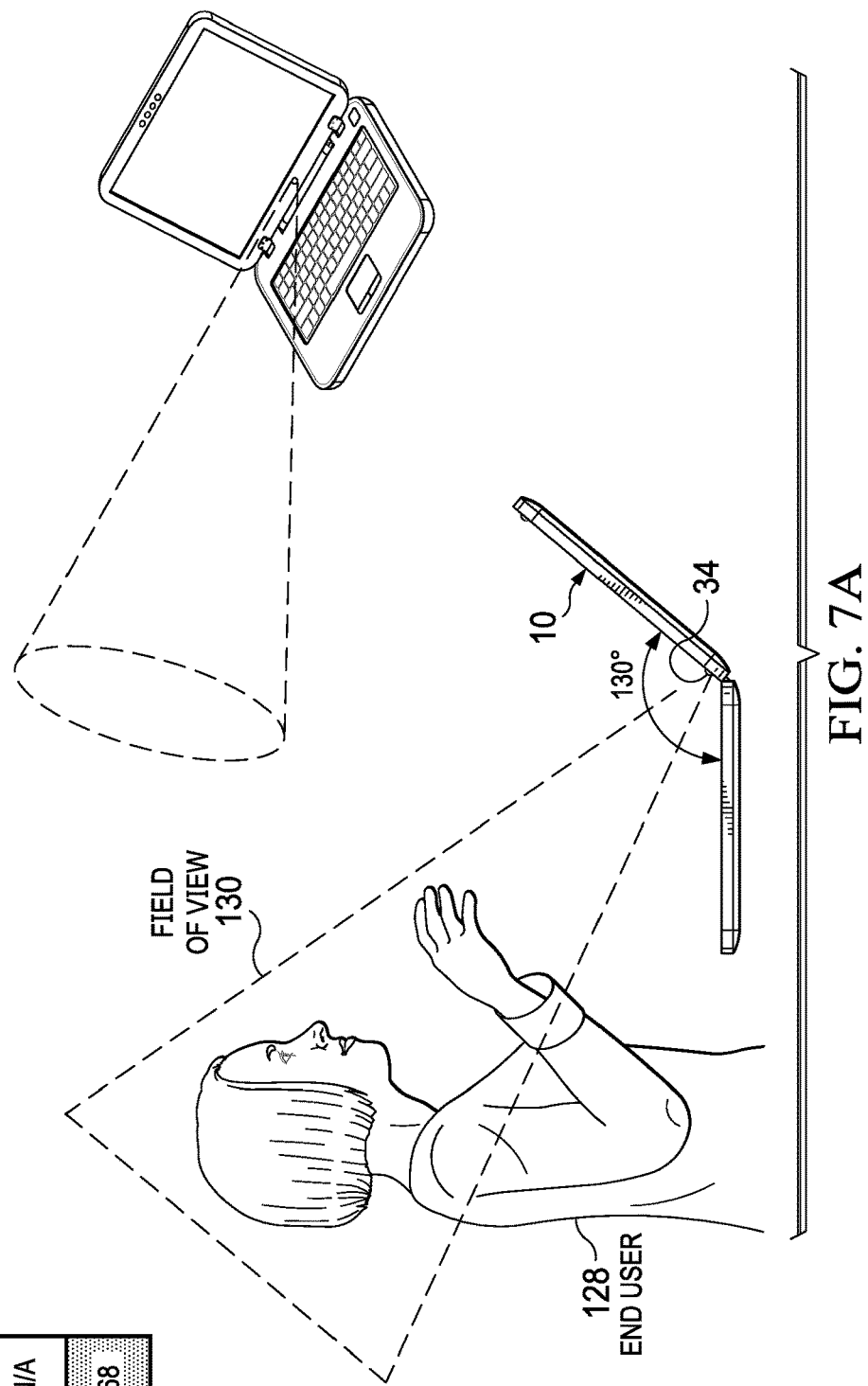

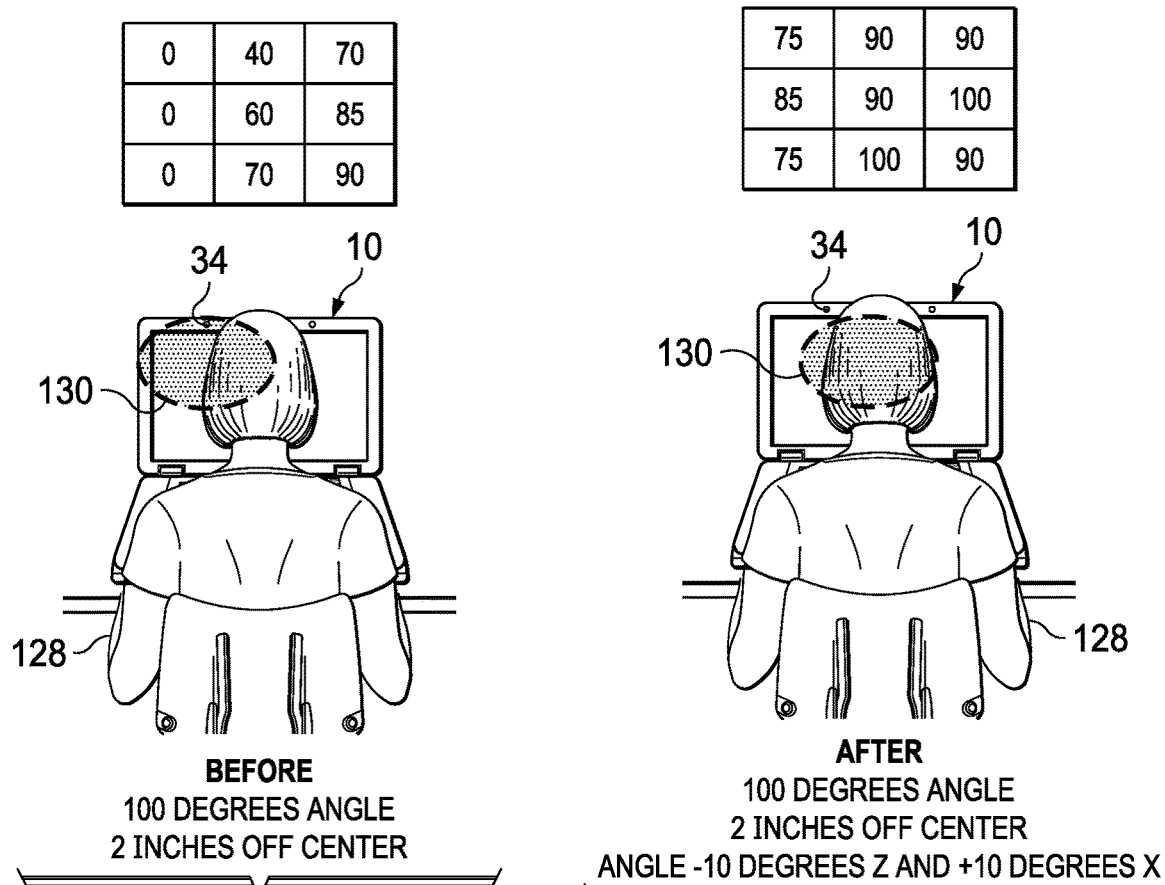

AUGMENTED INFORMATION HANDLING SYSTEM USER PRESENCE DETECTION

BACKGROUND OF THE INVENTION

Field of the Invention

The present invention relates in general to the field of information handling system end user interactions, and more particularly to an augmented information handling system dual user presence detection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information to end users as visual images at displays. Desktop information handling systems generally communicate visual images through a cable to one or more peripheral displays. Portable information handling systems typically integrate a display in a portable housing, but also support presentation of visual images at peripheral displays, such as with communication through a display cable.

Information handling systems consume electrical power even when not interacting with an end user. Generally, a number of standards and protocols exist that help to reduce power consumption, especially when an end user is not interacting with an information handling system. For example, a power management system executing in background will transition an information handling system to a low power state if an end user interaction is not detected for a configurable timeout. The Advanced Configuration and Power Interface (ACPI) standard is often used to power off a processor after an idle timeout, thus reducing power consumption, while retaining operating conditions in memory for a fast restart. The particular timeout may vary based upon whether a system has external power available or is operating on a battery. For instance, during battery operations a shorter timeout is often applied to help preserve battery charge life.

Instead of powering down an information handling system after an idle timeout, some end users leave a system operational but power down the display to reduce power consumption when the system is idle. In some instances, information handling systems transition first to a screensaver presentation and then to a power-off of the display. In many instances, display screensavers also provide security by requiring input of a password to authorize access after an idle timeout. Generally, the timeout is set as a power management or security configuration based upon timer that restarts each time an end user interacts with the information handling system.

Recently, an infrared (IR) time of flight (TOF) human proximity detection (HPD) sensor has become available that helps to more rapidly power down a display and/or information handling system if an end user is not present and keeps the information handling system fully operational if an end user is present. HPD sensors emit infrared illumination that reflects off proximate targets and measures the time of flight of the illumination to determine a distance to the target. Typically, the sensor scans through multiple sectors and compares distance to objects in the sectors over time to detect humans based upon small movements.

An advantage of IR TOF HPD sensors is that accurate and rapid detection of human proximity allows very responsive management of information handling system display and power settings. For instance, as soon as an end user leaves the area monitored by the sensor, the absence is rapidly detected so that the display is powered down and the information handling system is secured. As soon as the end user enters the area monitored by the sensor, the display and information handling system may automatically return to an operational state for accepting end user interactions. This rapid detection and response saves power and improves the end user experience by tracking user presence instead of user interactions so that the end user does not have to make periodic empty inputs meant to simply keep the system awake.

One difficulty with IR TOF HPD sensors is that their high degree of sensitivity can result in inadvertent information handling system end user interactions, such as shutting a display off when an end user is present. Such inadvertent interactions may result when an end user is to far from a sensor, too still or outside of the sensor's field of view. Inadvertent and unexpected power down of a display and/or system negatively impacts the end user experience.

SUMMARY OF THE INVENTION

Therefore, a need has arisen for a system and method which manages human presence detection sensors to adapt to information handling system context.

In accordance with the present invention, a system and method are provided which substantially reduce the disadvantages and problems associated with previous methods and systems for detecting human presence at an information handling system.

More specifically, an information handling system processes information with processing components disposed in a portable housing having rotationally coupled portions. One or more infrared (IR) time of flight (TOF) sensors detect end user presence or absence with a field of view directed from an integrated display perimeter towards an anticipated position of an end user. An integrated sensor hub receives information from plural sensors that provide context of the information handling system, such as housing portion rotational orientation, accelerations, ambient light, key inputs, touch inputs, etc. . . . Based upon sensed context, a presence/absence service and or application determines a confidence associated with IR TOF sensor presence and absence determinations to reduce inaccuracies and false alarms. For instance, rather than turning off a display as soon as a user absence is detected, a variable timeout may be applied during which the user absence state remains detected before the display is turned off. The variable timeout value is determined based upon a confidence of an accurate user absence determination in a detected context. Similarly, a power down state of the information handling system may be delayed based upon context, as may power up of a display to present visual images and power up of an information handing system from an off state.

The present invention provides a number of important technical advantages. One example of an important technical advantage is that IR TOF sensors rapidly adapt information handling system display and/or power states with improved accuracy and reduced false alarms by referencing context at an information handling system. Confidence in an IR TOF sensor presence and absence determinations is adjusted based upon sensed context so that application of a presence or absence state change may be adjusted, such as by varying a timeout based upon context during which the presence or absence detection must stay consistent. Adjusting application of presence and absence detection to system operations based upon context-based confidence reduces false alarms that can cause an information handling system to transition to an off state during passive end user interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6A and 6B depict an example of an IR TOF sensor field of view and scan area with information handling system housing portions rotated 130 degrees;

FIGS. 7A and 7B depict one alternative embodiment of a location of an IR TOF sensor proximate a rotation axis to improve field of view incidence with expected end user position;

FIGS. 8A and 8B depict an alternative embodiment of first and second fields of view provided by first and second IR TOF sensors;

FIGS. 10A and 10B depict an example embodiment of an IR TOF sensor disposed away from a central location of an information handling system housing and having a field of view axis corrected to an end user position.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
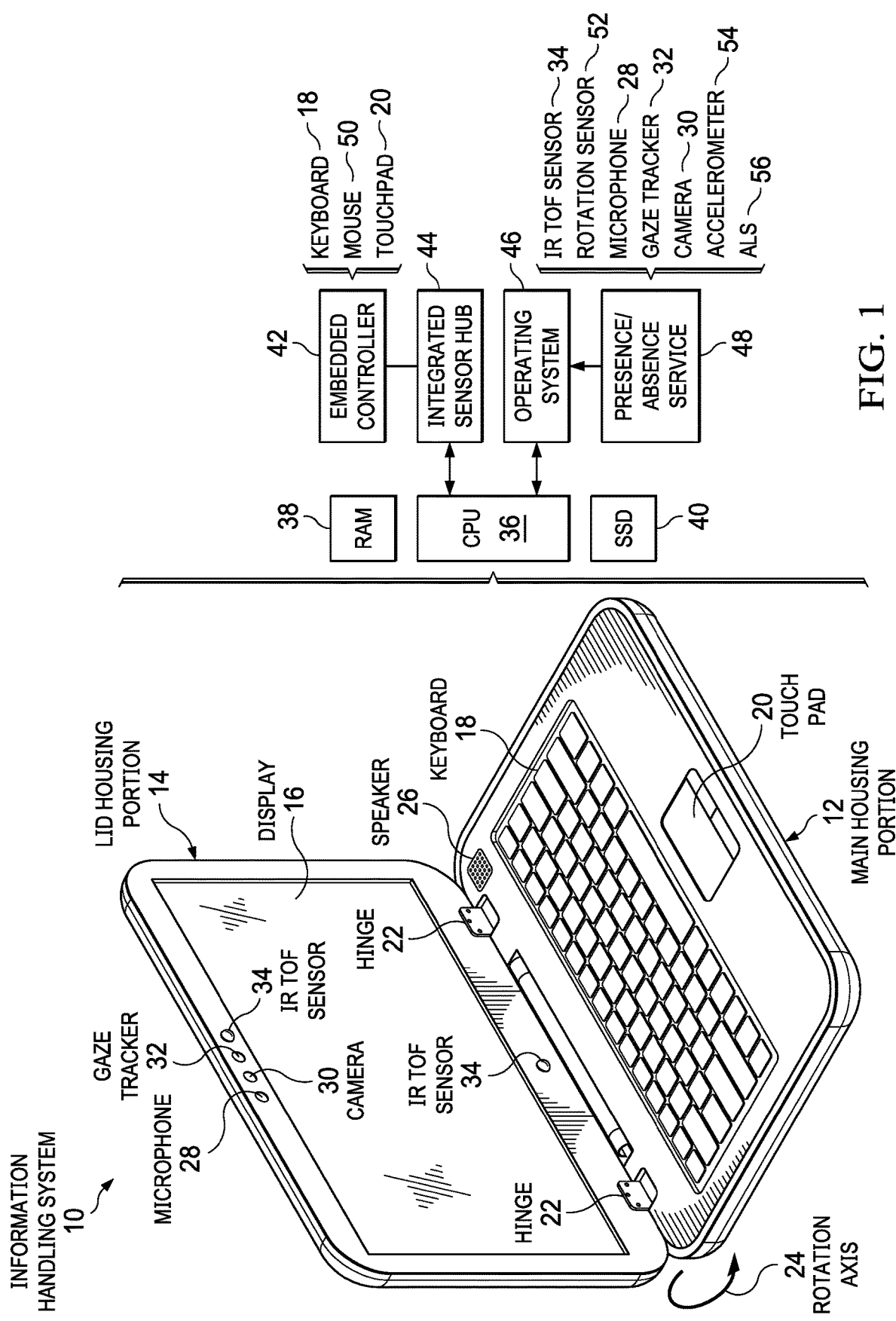
FIG. 1 depicts a block diagram of an information handling system configured to manage infrared time of flight presence detection based upon sensed context.

Referring now to FIG. 1, a block diagram depicts an information handling system 10 configured to manage infrared time of flight presence detection based upon sensed context. In the example embodiment, information handling system 10 has a portable form factor with processing components disposed in a main housing portion 12 and a display 16 integrated in a lid housing portion 14 to present information as visual images. A keyboard 18 and touchpad 20 integrate in main housing portion 12 to accept end user inputs. In alternative embodiments, display 16 includes a touch detection surface to accept touch inputs and other peripheral input devices that may interface with processing components, such as a peripheral keyboard 18 and mouse 50. The portable form factor provides a clamshell configuration having main housing 12 resting on a support surface to hold keyboard 18 in a horizontal typing orientation and display 16 in a vertical viewing orientation raised above keyboard 18. For instance, main housing 12 rotationally couples to lid housing 14 with hinges 22 to rotate about a rotational axis 24. The example embodiment rotates from a closed position having display 16 placed over keyboard 18 to the depicted clamshell position. In alternative embodiments, lid housing 14 may rotate 360 degrees relative to main housing 12 to expose display 16 in a tablet configuration with keyboard 18 hidden at a bottom surface of information handling system 10.

Information handling system 10 includes a variety of sensors that help to detect whether an end user is actively interacting with the system. Generally, information handling system 10 knows of end user interactions when an end user actively makes inputs, such as at keyboard 18, touchpad 20, display 16 and peripheral input devices. Often an end user passively interacts with an information handling system by consuming visual images presented at display 16 or audible sounds presented at a speaker 26 without making inputs. In such instances, information handling system 10 has to balance whether it should remain active and available to the end user or power down display 16 and other processing components to save power. In addition to keyboard 18, touchpad 20, a touchscreen of display 16 and other input devices, a variety of sensors are exposed at information handling system 10 to provide a context of end user interactions at information handling system 10. In the example embodiment, additional context is sensed by a microphone 28 that captures audible noise, a camera 30 that captures visual images, a gaze tracker 32 that captures reflected infrared light to detect eye gaze direction and a pair of infrared time of flight (IR TOF) sensors that detect objects proximate to information handling system 10.

Finding an appropriate balance for powering down information handling system 10 and/or display 16 without disturbing end user passive interactions can present a difficult challenge. IR TOF sensors 34 provide a valuable tool by rapidly detecting end user presence and end user absence states so that information handling system 10 can power down as soon as an end user is absent and power up as soon as the end user returns. IR TOF sensors 34 operate by scanning an infrared beam across a field of view and detecting objects based upon the time of flight of reflected infrared energy back to the sensor. Precise distance calculations over a series of repeated scans detect a human presence as an object in the field of view that has some amount of movement. During time periods of an absence state, IR TOF sensors 34 consume minimal power while scanning a field of view in front of display 16 while processing components entered reduced power consumption modes. Information handling system 10 rapidly resumes a power on state as soon as an end user is detected so that reducing power consumption during the absence state minimally impacts end user interactions. Similarly, during normal operations of a presence state, a constant scan within the field of view of the IR TOF sensor 34 quickly detects movement by an end user out of the field of view. In this manner, a rapid transition to a low power state reduces power consumption and increases system security by implementing end user absence steps as soon as end user absence is detected. Untimely transitions between low power and normal operating states related to absence and presence detection can disrupt the end user experience.

In the example embodiment, a central processing unit (CPU) 36 executes instructions stored in random access memory (RAM) 38 to process information, such as for presentation as visual images at display 16. For instance, instructions of an operating system 46 are retrieved from persistent storage of a solid state drive (SSD) 40, such as with boot instructions executed on an embedded controller 42. As CPU 36 executes instructions of operating system 46, an integrated sensor hub (ISH) 44 within CPU 36 manages sensor inputs to define a context sensed at information handling system 10. For instance, integrated sensor hub 44 is provided as an integrated portion of CPU 36 as defined by the INTEL processor architecture. In alternative embodiments, other types of hardware architectures may be used to manage sensor context for improving power and display end user interactions in response to IR TOF sensor 34 user absence and user presence indications.

The example embodiment depicts a presence/absence service 48 integrated with operating system 46 that accepts sensor inputs to determine a context at information handling system 10 and applies the context to manage application of IR TOF sensor 34 user absence and user presence detection. For instance, presence/absence service 48 interfaces with embedded controller 42 to obtain context based upon input device interactions, such as key or touch inputs. In addition, presence/absence service 48 interfaces with drivers of other sensors to monitor sensed conditions that define a context for enhance management of information handling system 10 power and display presentation state. For instance, IR TOF sensor 34 outputs a user presence or user absence state based upon detection of an end user in the field of view. At each transition between user presence and user absence, presence/absence service 48 determines whether to wake or sleep processing and display resources; however, relying upon just the user presence state or user absence state without additional context can distract from the end user interaction experience, such as by causing the display to go blank while the end user is viewing presented information. A rotation sensor 52 provides context by detecting rotational orientation of main housing portion 12 relative to lid housing portion 14 about rotation axis 24, which indicates a likely intersection of IR TOF sensor 34's field of view and an end user viewing position. A microphone 28 provides context by detecting audible sounds, which may indicate an end user presence and distance when the end user is outside of IR TOF sensor 34 field of view or not detected by IR TOF sensor 34, such as can happen during periods of inactivity. Gaze tracker 32 provides context with infrared detection based upon eye pupil reflection so that presence of eyes is detectable when a lack of motion makes IR TOF sensor 34 less reliable. Camera 30 provides context with visual light images that can confirm user presence or absence, such as with an analysis for a human form in a captured image. Accelerometers 54 provide context by detecting accelerations associated with end user presence, such as writing, tapping, footsteps, etc . . . . An ambient light sensor (ALS) 56 provides context by detecting ambient light levels proximate information handling system 10, such as may change as interior lighting is turned on and off.

Presence/absence service 48 may transition between end user present and end user absent operating states based upon a variety of sensed contexts in consideration of transitions communicated by IR TOF sensor 34 between user absence and user presence states. In one example embodiment, presence/absence service 48 maintains a timer that defines a delay from detection of a transition of a user absence and user presence state to application of the detected state to the operating state of the information handling system, such as powering down or up a display or processing components. For instance, a context having recent keyboard or touch inputs indicates that a user is present so that an increased timeout may be applied after transition of the user presence and user absence state until transition of the operating state. As the time from the last keyboard or touch input increases, the timeout to transition the system operating state after an IR TOF sensor 34 transition may decrease. As another example, rotation sensor 52 context helps to define an expected end user position relative to an IR TOF sensor field of view so that a greater timeout may apply to changes in the operating state when less accuracy is available for presence detection due to field of view orientation. Microphone 28, gaze tracker 32, camera 30, accelerometer 54 and ALS 56 each offer additional user presence indications that help to confirm indications of user presence and user absence provided by IR TOF sensor 34. Often, such sensor inputs result in operations by CPU 36 that can increase system load and power consumption, however, when used to confirm transitions detected by IR TOF sensor 34, the impact on system operations and power consumption can be minimized. In various embodiments, specific sensed conditions may carry additional weight in determining a timeout for operational state transitions. For instance, a "nonsense" input at a touchpad may indicate that an end user is trying to keep the system awake for passive consumption of information while intentional touch inputs indicate an active interaction; each type of input may have its own associated operating system transition timeout. Further, timeout values may depend on security settings at information handling system 10. For example, in a more secure setting, timeouts to power down a display may be quicker than in a less secure setting.

Figure 2:
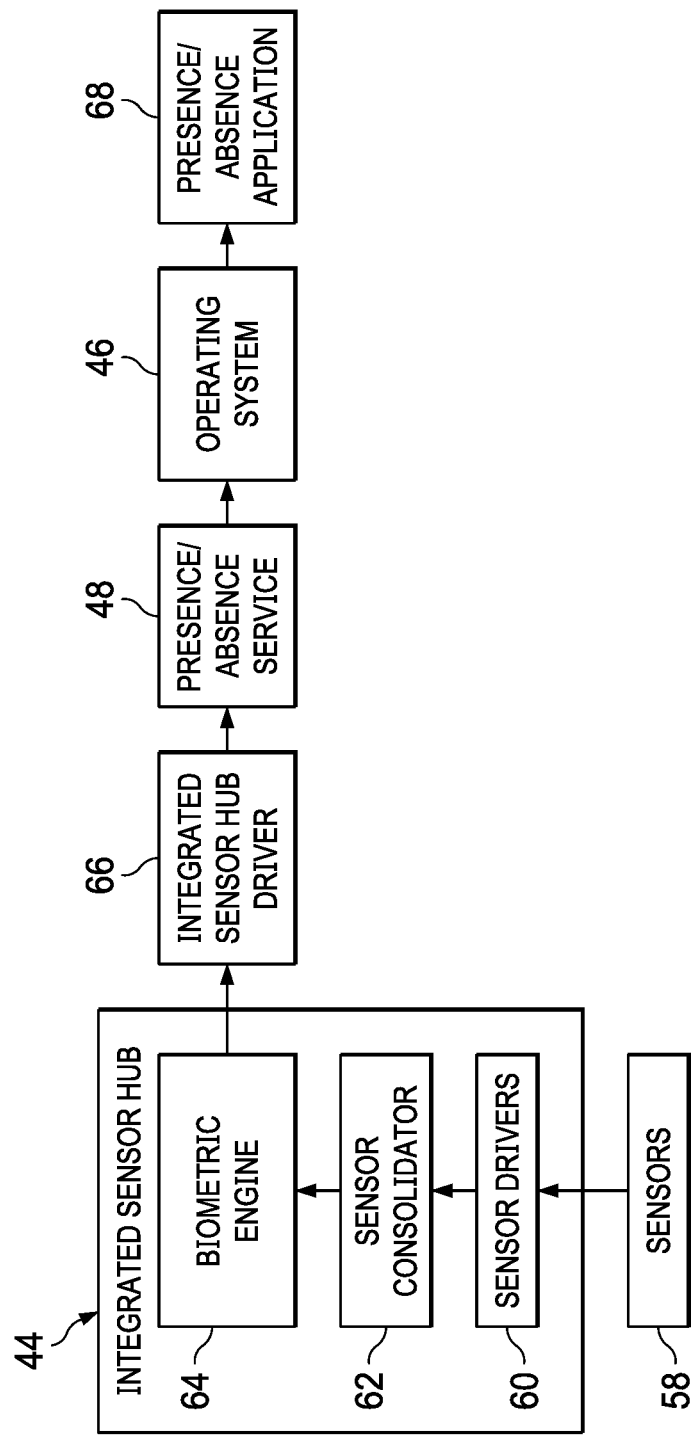
FIG. 2 depicts a block diagram of a system for managing display and/or power transitions at an information handling system in response to changes in a user absence user presence state at an IR TOF sensor.

Referring now to FIG. 2, a block diagram depicts a system for managing display and/or power transitions at an information handling system in response to changes in a user absence user presence state at an IR TOF sensor. In the example embodiment, firmware, software and operating system elements interact to confirm that an information handling system should transition a power and/or display state when an IR TOF sensor state changes. With an INTEL ISH 44 architecture, sensors 58 provide sensed context to ISH 44 within a CPU 36, such as sensed housing rotation angle, ambient light, accelerations, gaze tracking, etc. . . . . Sensor drivers 60, such as for an operating system executing on CPU 36, accept the sensed inputs and provide the sensed input to a sensor consolidator 62. Sensor consolidator 62 receives the sensed inputs and parses the raw data into a format that relates to context at information handling system 10. A biometric engine 64 receives the output of sensor consolidator 62 and applies the context to generate a binary output of user presence or absence. As described above, user presence and absence indications from IR TOF sensor 34 may be applied with a variable delay based upon sensed context. That is, a user absence transition by IR TOF sensor 34 will be delayed by a timeout with a value set based upon sensed context so that the user absence state is not communicated from biometric engine 64 unless IR TOF sensor 34 remains in the user absence state until the timeout occurs. Similarly, a user presence state may have a separate timeout value that is also determined from sensed context. In each case, biometric engine 64 applies context with a goal achieving increased confidence for the accuracy of user absence and user presence states reported by IR TOF sensor 34.

An ISH driver 66, such as an operating system driver, receives the user absence and user presence states reported by biometric engine 64 and provides the state to a presence/absence service 48 that interfaces with operating system 46. Based upon the user absence or user presence state reported by presence/absence service 48, operating system 46 adapts the display and/or power management for information handling system 10 with instructions to a presence/absence application 68. In various embodiments, the application of IR TOF sensor to adjust display and/or power states at information handling system 10 may be performed with instructions and data distributed across various hardware, software and firmware elements. For instance, sensed context may be determined by biometric engine 64 as a confidence level that reflects a likelihood that IR TOF sensor 34 presence and absence states are accurate. As another example, a variable timer may be set up within presence/absence service 48 or presence/absence application 68. Alternatively, biometric engine 64 may sort out and communicate raw context information that is applied at presence/absence service 48 or presence/absence application 68. Various allocations of context functionality will impact timeliness of presence and absence determinations and the ability of managing user selected configurations. In summary, presence/absence service 48 receives user presence service determinations from biometric engine 64 to override false misses and alarms of IR TOF sensor 34 and feed a final determination of user presence to presence/absence application 68.

Figure 3:
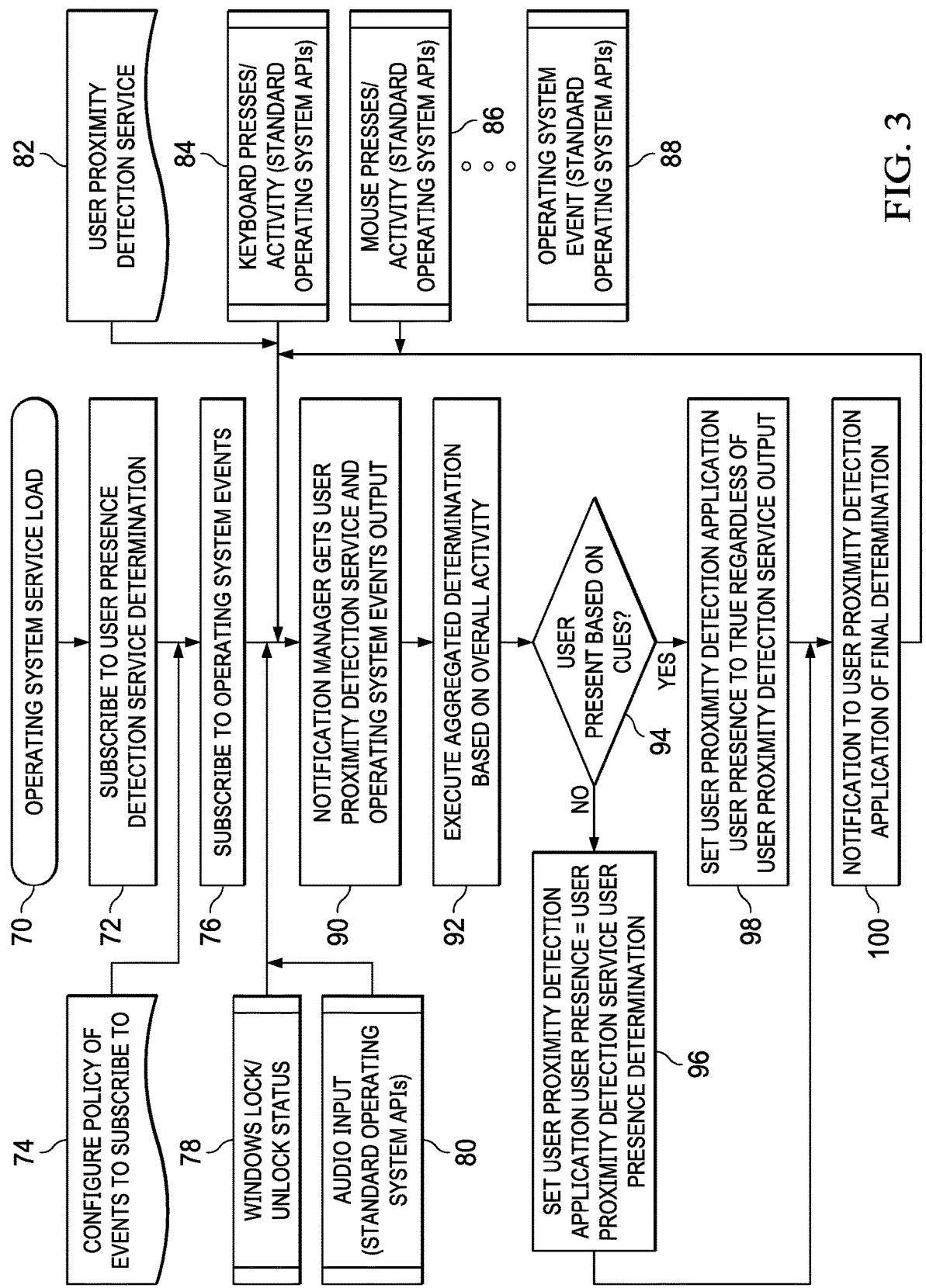
FIG. 3 depicts a flow diagram depicting a process for detecting end user presence and absence for application to an information handling system power and/or display state.

Referring now to FIG. 3, a flow diagram depicts a process for detecting end user presence and absence for application to an information handling system power and/or display state. The process starts at step 70 with loading by the operating system of the presence/absence service. At step 72, the operating system subscribes to the user proximity detection (UPD) service determination of user presence and user absence. At step 74, configuration settings for the policy of events subscribed to are retrieved and, at step 76, the presence/absence application subscribes to operating system events reported by the presence/absence service. Once the information handling system and operating system are configured and initiated to manage user proximity detection, the process continues to step 90 at which a notification manager gets user proximity detection service and operating system event outputs from step 82. In the example embodiment, a number of inputs are monitored at step 90 to manage user presence detection. For example, at step 84 keyboard presses and activities monitored by standard operating system APIs provide an indication of end user interactions. Similarly, at step 86 mouse, touchpad and touchscreen presses provide indications of end user inputs. A comparison of IR TOF sensor detection and end user interactions provides a confidence for the accuracy of end user detection. For instance, if end user absence is indicated by IR TOF sensor detection while active end user inputs are detected at a keyboard or touch device, a greater timeout may be applied to transitions of user presence and user absence to help avoid false positives and false alarms. In the example embodiment, other types of end user presence/absence indications may include at step 88 other operating system indications of events, at step 78 WINDOWS lock and unlock status, and at step 80 audio inputs. At step 92, the aggregation of end user presence and absence based upon overall activity is applied to adapt presence and absence transitions commanded based upon IR TOF sensor indications. For instance, the aggregation of other biometric factors may be applied to adjust a variable timeout that expires before an IR TOF sensor presence/absence indication is applied to transition an information handling system display and/or proximity state.

At step 94 a determination is made based upon sensed context and IR TOF sensor detection whether an end user is present based upon detected cues. If the end user is not present based upon the additional cues, the process continues to step 96 to set the user presence detection application to the user presence determination from the IR TOF sensor. In such a state, the IR TOF sensor user absence detection is considered to have a higher confidence so that a more rapid user absence indication may be issued once the IR TOF sensor detects a user absence. If at step 94 the end user is present based upon the cues, the process continues to step 98 to set the user presence detection to true regardless of the IR TOF sensor user presence detection service output. In this manner, a false user absence detection by the IR TOF sensor is avoided where other indications of user presence override. At step 100 a notification is provided to the user presence/absence application of the presence/absence indication and the process returns to step 90 to continue monitoring for user presence/absence state transitions.

In various embodiments, notifications at step 100 may include various amounts of raw information from sensors to aid in operation of the user presence/absence application, such as allowing machine learning to aid more accurate presence/absence detection. For instance, in addition to presence/absence indications from the IR TOF sensor, the amount of the field of view of the IR TOF sensor that provides a presence indication and any delay applied by the presence/absence service may be included. In one alternative embodiment, some or all of the operating system indications may be gathered by the presence/absence application and analyzed to improve logic applied to power and/or display transitions. In one example embodiment, the presence/absence application may apply presence/absence determinations from plural IR TOF sensors to further improve detection accuracy. The plural IR TOF sensors may be distributed at different locations of an information handling system housing, such as at the top and bottom of a display as depicted by FIG. 1.

Figure 4:
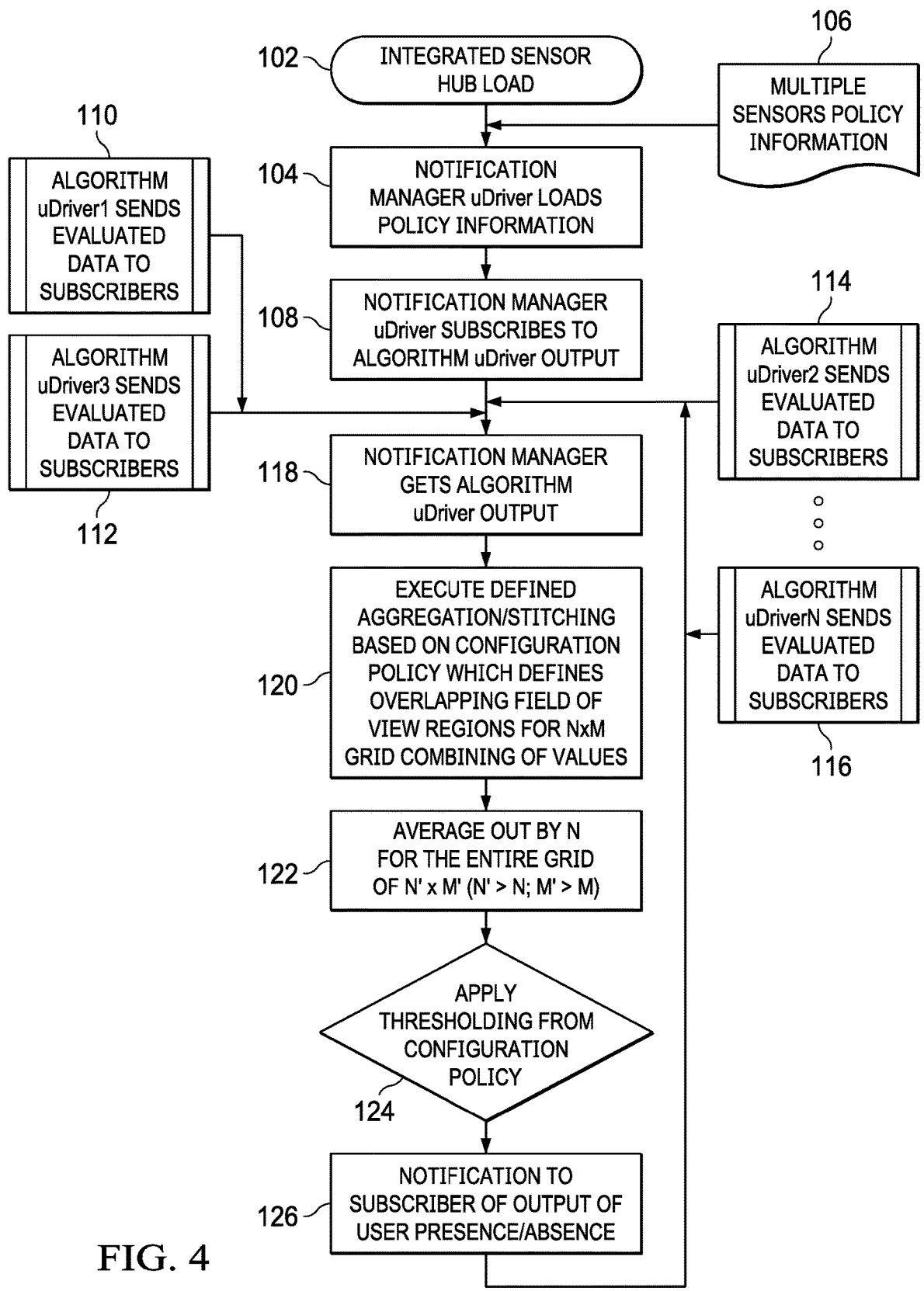
FIG. 4 depicts a flow diagram of a process for consolidating inputs by multiple sensors to report an end user presence or absence.

Referring now to FIG. 4, a flow diagram depicts a process for consolidating inputs by multiple sensors to report an end user presence or absence. The process starts at step 102 by loading monitoring logic at an integrated sensor hub, such as an ISH of the INTEL architecture. At step 104, a notification manager "uDriver" loads policy information provided at step 106 from multiple sensors policy information configurations. At step 108, the notification manager uDriver subscribes to a sensor consolidator algorithm output so that the multiple sensors provide an output from the biometric engine that reflects the totality of sensed data. At step 118, the notification manager receives the uDriver data from each of the subscribed sensors. In the example embodiment, at steps 110, 112, 114 and 116 each uDriver provides sensed input to the sensor consolidators. Although each uDriver may be associated with a separate sensor or group of sensors, in one example embodiment, uDrivers may overlap sensed about to provide various types of context for analysis by the sensor consolidator. At step 120, the consolidator executes defined aggregation/stitching of sensed data based upon configuration policies, such as defined overlapping field of views of multiple IR TOF sensors. For instance, overlapping portions of the field of view may be compared to determine if both sensors match the presence or absence detected in an overlapping scan area so that a confidence is determined of each sensor having an accurate detection. At step 122, one example of an averaging algorithm is depicted in which an N×M grid scanned by plural sensors has averaged values that are set by policy. For instance, relative confidence of a presence/absence detection within a grid zone may vary with a policy that considers the number and accuracy of sensors applied in gird zone. At step 124, a threshold is applied from the configuration policy to the sensed data to confirm a presence/absence detection and, at step 126 a notification is sent to subscribers of the output of the user presence/absence service. The process then returns to step 118 to continue monitoring for presence and absence detection.

Figure 5A:
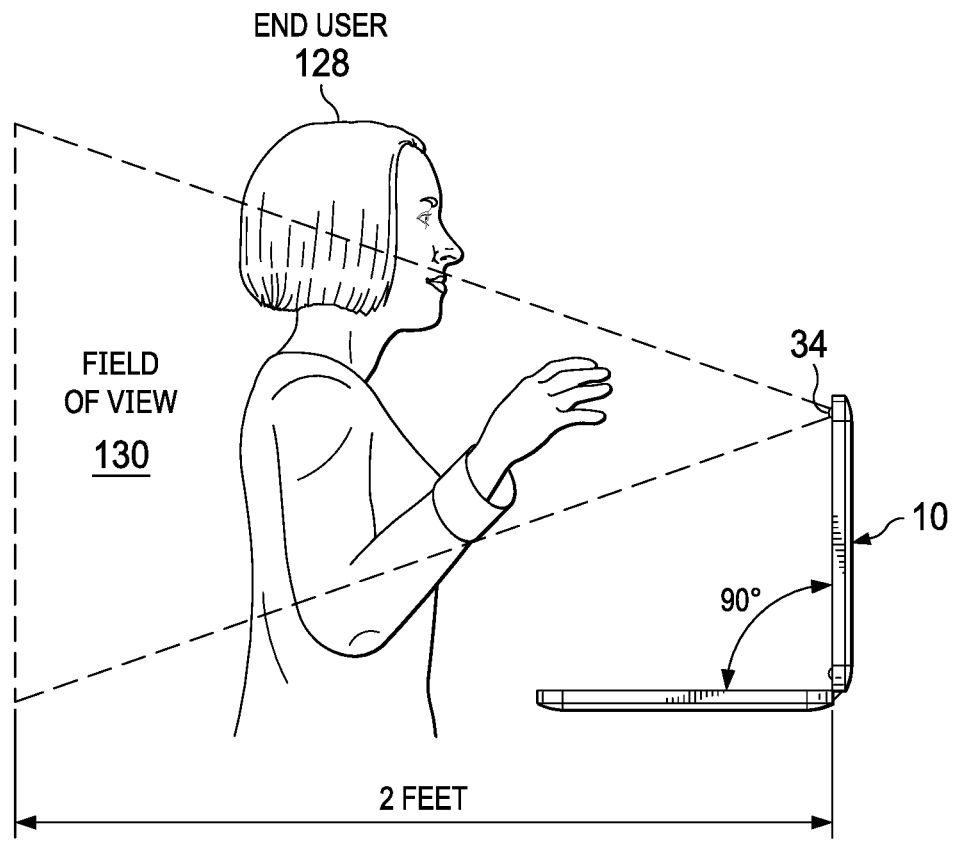
FIGS. 5A and 5B depict an example of an IR TOF sensor field of view and scan area.
Figure 5B:
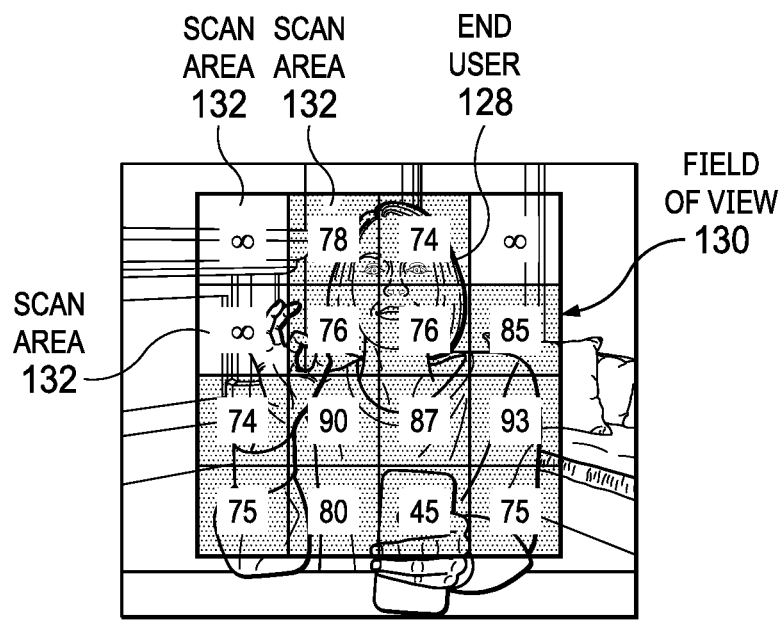

Referring now to FIGS. 5A and 5B, an example of an IR TOF sensor 34 field of view 130 and scan area 132 is depicted. In the example embodiment, IR TOF sensor 34 is located at a top portion of information handling system 10 so that, in a clamshell viewing position having 90 degrees of housing portion rotation, field of view 130 falls over the expected position of an end user 128. Field of view 130 has a total cone angle of 28 degrees and scans an infrared illumination source across 16 rectangular scan areas 132 as shown in FIG. 5B. In each scan area 132, a sensor detects reflected IR energy and applies a time of flight to determine object distances in the scan area 132. By quickly cycling through the 4×4 grid of scan areas 132, changes in distance detected in each scan area 132 indicate a presence or absence of a biological mass, such as with a comparative analysis of IR TOF sensor 34 time events. In some example embodiments, IR TOF sensor 34 has sensitivity sufficient to detect end user presence based on motion from breathing of the end user.

Referring now to FIGS. 6A and 6B, an example of an IR TOF sensor field of view and scan area are depicted with information handling system housing portions rotated 130 degrees. In the example embodiment, end user 128 is only partially located in field of view 130, which has skewed upwards due to the increased angular rotation of IR TFO sensor 34 relative to a supporting surface of information handling system 10. FIG. 6B depicts that only scan areas 132 located at the bottom of field of view 130 capture end user 128. In a situation where only a small portion of end user 128 is in field of view 130, a reduced confidence is provided for an accurate user absence indication, both because fewer scans cover the area in which the end user is located and also because a lower likelihood exists for detecting motion of the end user.

In an example situation such as that depicted by FIGS. 6A and 6B, managing user presence and absence with context provided by other sensors can have a greater priority than when a user falls completely within a field of view 130 as depicted by FIGS. 5A and 5B. As one example, sensed angle of rotation of the housing portions of information handling system 10 provides an indication of likely orientation of field of view 130 relative to end user 128 and, thus, a confidence that IR TOF sensor 34 will provide an accurate presence/absence output. In the event of a reduced coincidence between end user 128 position and field of view 130 direction, an increased timeout may be applied to changes in presence/absence state for adapting power or display operations. For instance, with only two scan areas 132 over an end user, an increased timeout reduces the likelihood of a false alarm where end user detection accuracy is decreased. As described above, other sensed inputs may similarly be consolidated to adjust user presence/absence detection timeout based upon an expected impact on the confidence of IR TOF sensor 34 accuracy.

Referring now to FIGS. 7A and 7B, one alternative embodiment depicts a location of an IR TOF sensor 34 proximate a rotation axis to improve field of view 130 incidence with expected end user 128 position. In the example embodiment, IR TOF sensor 34 is located at a bottom side of a display integrated in information handling system 10 to effectively shift field of view 130 down by the height of the housing portion. Compared with the position distal the rotational axis depicted in FIG. 6A, the position located near the rotational axis places the end user 128 squarely within the scan areas 132, as shown by FIG. 7B. Locating field of view 130 more centrally over end user 128 allows an increased confidence in end user absence and presence detection.

Figure 8A:
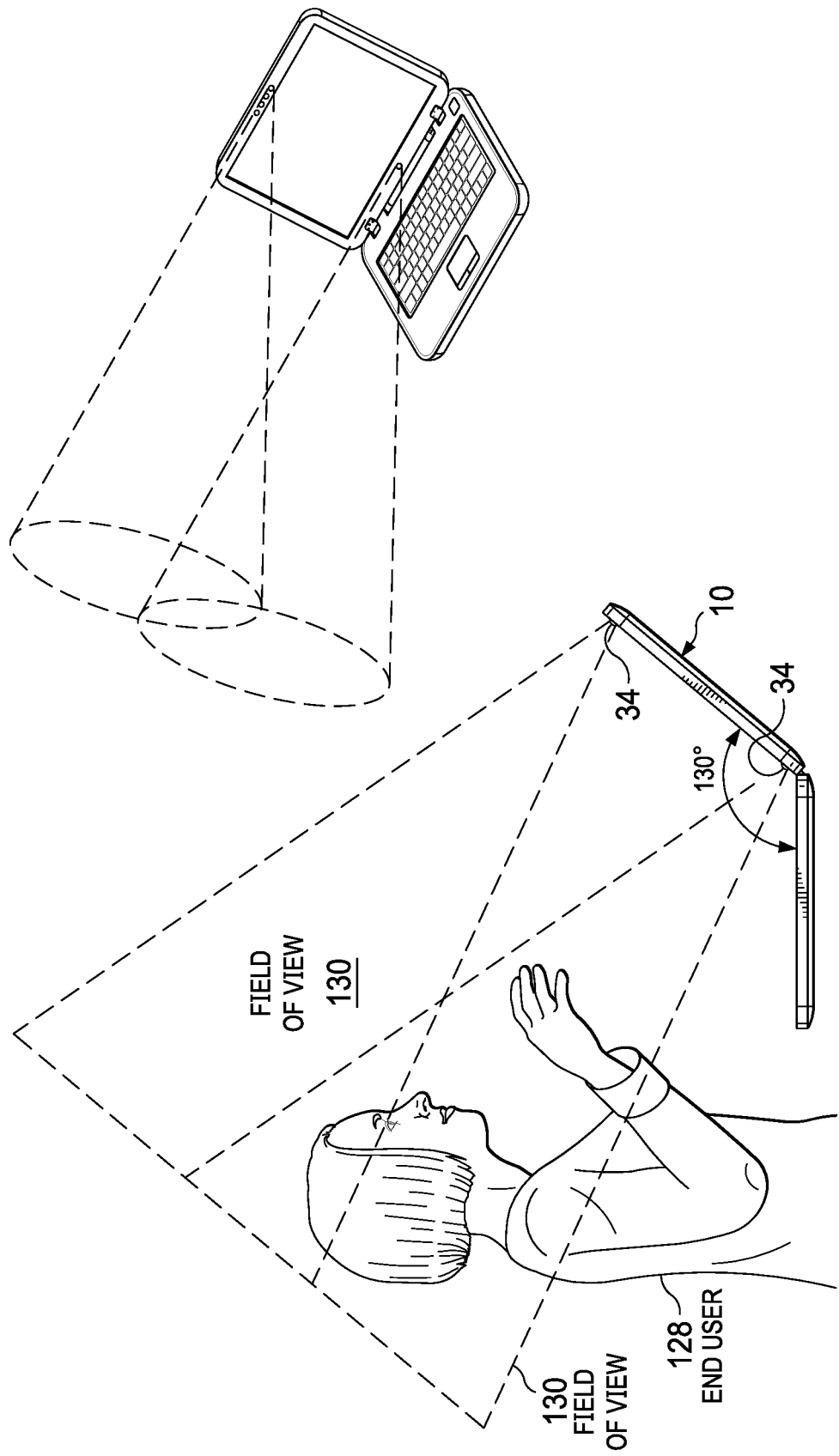

Referring now to FIGS. 8A and 8B, an alternative embodiment depicts first and second fields of view 130 provided by first and second IR TOF sensors 34. In the example embodiment, IR TOF sensors 34 are disposed on opposing top and bottom positions of a display integrated in information handling system 10. As illustrated by FIG. 8B, at a typical range at which an end user is located, an overlap occurs at two of the scan areas 132 so that both IR TOF sensors 34 detect the end user 128. As discussed above, overlapping scan areas 132 provide an increased confidence in absence and presence detection by allowing a comparison of detection results in the overlapping region. In the example embodiment, both IR TOF sensors 34 are centrally located in a middle part of the housing so that central portions of field of views 130 overlap. In alternative embodiments, one IR TOF sensor 34 may be located or directed towards the right side of information handling system 10 while the other IR TOF sensor 34 is located or directed towards the left side of information handling system 10, such as to have side portions of the field of view overlap instead of the top and bottom portions.

In one example embodiment, an IR TOF sensor 34 having the best field of view 130 coverage of the end user may be used for presence/absence detection while the other IR TOF sensor 34 is powered down. Alternatively, a reduced number of scans, such as with a reduced scan rate, may be used at the IR TOF sensor 34 having the least end user coverage. In one example embodiment, IR TOF sensors 34 scan in sequence, one after the other, to reduce interference that might result from simultaneous infrared illumination by both IR TOF sensors 34. In an alternative embodiment, intermittent scans by both sensors may be coordinated, such as scanning a first row of the upper IR TOF sensor 34, followed by a first row of the lower IR TOF sensor 34, and then the next row of the upper IR TOF sensor 34, etc. . . . . In various embodiments, the use of a single IR TOF sensor 34 versus a consolidated output derived from both IR TOF sensors 34 may be used based upon a security condition at information handling system 10. For instance, transition to presentation of visual images at a display based upon a detected user presence may require a consolidated user presence detection in a high security environment while just requiring a single IR TOF sensor detection in a low security environment.

Figure 9:
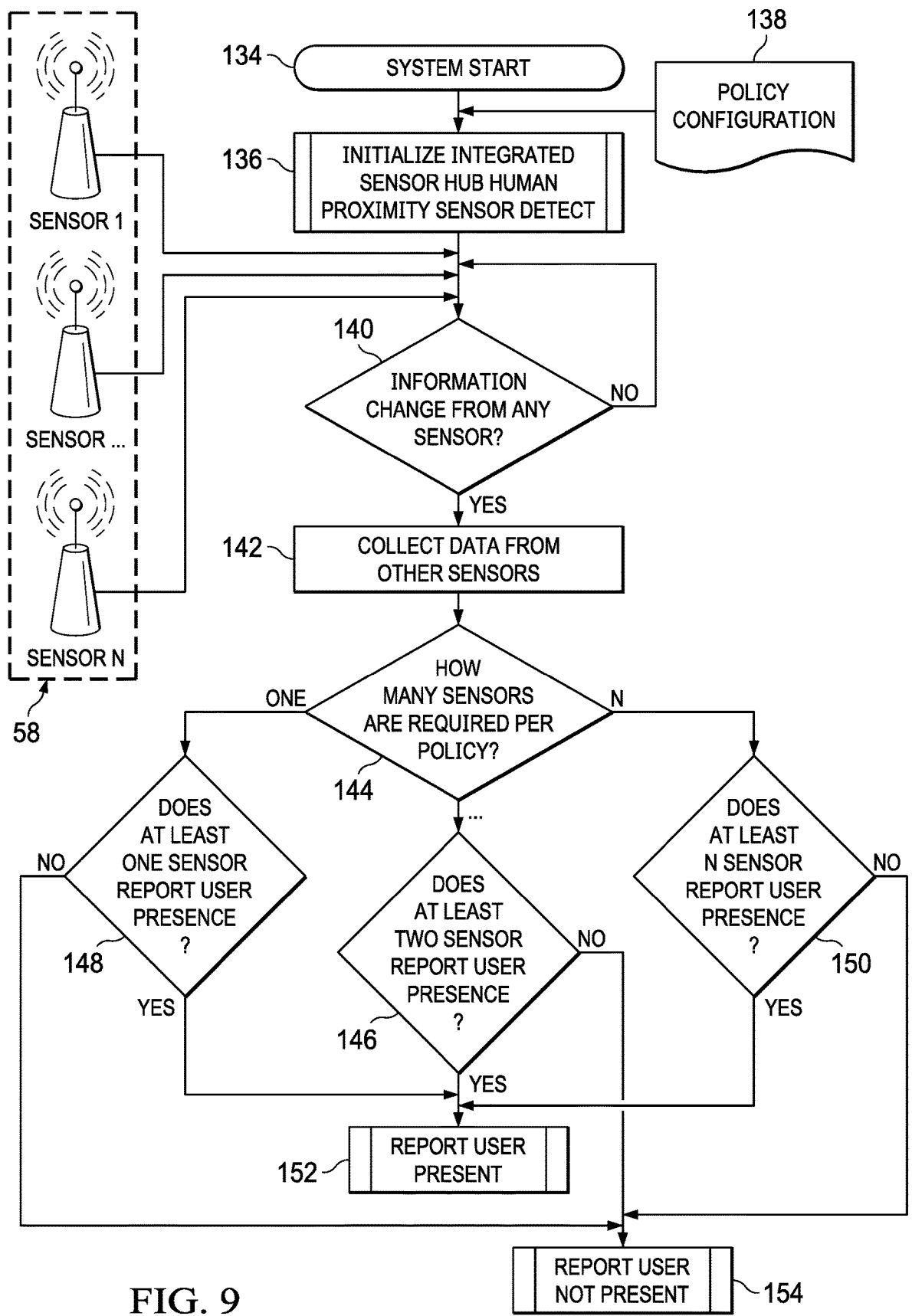
FIG. 9 depicts a flow diagram of a process for determining user presence and user absence with a predetermined confidence through consolidation of sensed inputs across plural sensors.

Referring now to FIG. 9, a flow diagram depicts a process for determining user presence and user absence with a predetermined confidence through consolidation of sensed inputs across plural sensors. The process starts at step 134 with system start and, at step 136 initiates integrated sensor hub proximity sensor detection using policy settings provided at step 138. Once the user presence and absence detection is initiated in accordance with configuration policies, the process monitors sensed context at step 140 based upon inputs from sensors 58 until a sensed condition changes that indicates a user presence. At step 142, sensed conditions are detected and collected from available sensors to define a complete context. The process then continues to step 144 to determine the number of sensors called for by the configuration policy in order to have sufficient confidence of a user presence detection. The example embodiment depicts example results associated with one required sensor at step 148, two required sensors at step 146 and N number of sensors at step 150. In each case, a determination is made of whether the required number of sensors confirm the change in presence state and, if so at step 152 a user presence state is issued. If insufficient confidence exists to issue a user presence state, the process continues to step 154. As described above, the multiple sensors may be multiple IR TOF sensors and additional sensors that provide context. For instance, in a high security configuration, an information handling system may require presence detection by two IR TOF sensors to wake, while in a lower security configuration a single IR TOF sensor may wake the system when presence is confirmed by context provided by at least one other sensor, such as accelerations that indicate an end user vibration in proximity with the information handling system.

Referring now to FIGS. 10A and 10B, an example embodiment depicts an IR TOF sensor 34 disposed away from a central location of an information handling system housing and having a field of view axis corrected to an end user position. In the example embodiment, FIG. 10A depicts end user 128 relative to a field of view 130 provided by an IR TOF sensor 34 located two inches from a center top position of information handling system 10. FIG. 10B depicts the end user 128 relative to the field of view 130 provided by IR TOF sensor 34 in the same off-center location but directed ten degrees to the right and ten degrees down relative to end user 128. IR TOF sensor 34 may be permanently directed along the axis depicted by FIG. 10B or may have an actuator that adjusts the angle at which field of view 130 proceeds out from information handling system 10. In an example embodiment having multiple IR TOF sensors 34, the intersection of fields of views 130 from each IR TOF sensor 34 provides additional confidence related to a presence and absence determination by comparing distances determined by each IR TOF sensor 34 with scan areas that should intersect at the distance.

In one example embodiment, field of view 130 position is optimized by changing the direction at which IR TOF sensor 34 is pointed based upon sensed context. For instance, a driver within an integrated sensor hub monitors context, such as hinge rotation angle, and alters the direction of IR TOF sensor 34 by a defined look up table to center field of view 130 on an anticipated end user position. When an end user's physical characteristics are known, the position of IR TOF sensor 34 may take those characteristics into consideration, such as the end user's height and weight. In one example embodiment, an end user may adjust field of view 130 orientation to adapt to other variations, such as chair height or a standing position. In some instances, automated adjustments may be performed, such as with a camera that captures a visual image of a greater cone than field of view 130. Scan angle and/or algorithm detection patterns within a field of view may be based upon information handling system housing portion rotational orientation and other context to enhance detection, tracking and power consumption by the IR TOF sensors 34. For instance, in a low threat environment, a single IR TOF sensor 34 may center on an expected end user position while other IR TOF sensors 34 power down to reduce power consumption. At a higher security setting, both IR TOF sensors 34 may center on a common expected end user location and take turns scanning the field of view one after the other so that a user presence determination depends on both IR TOF sensors 34 detecting the end user.

Figure 11:
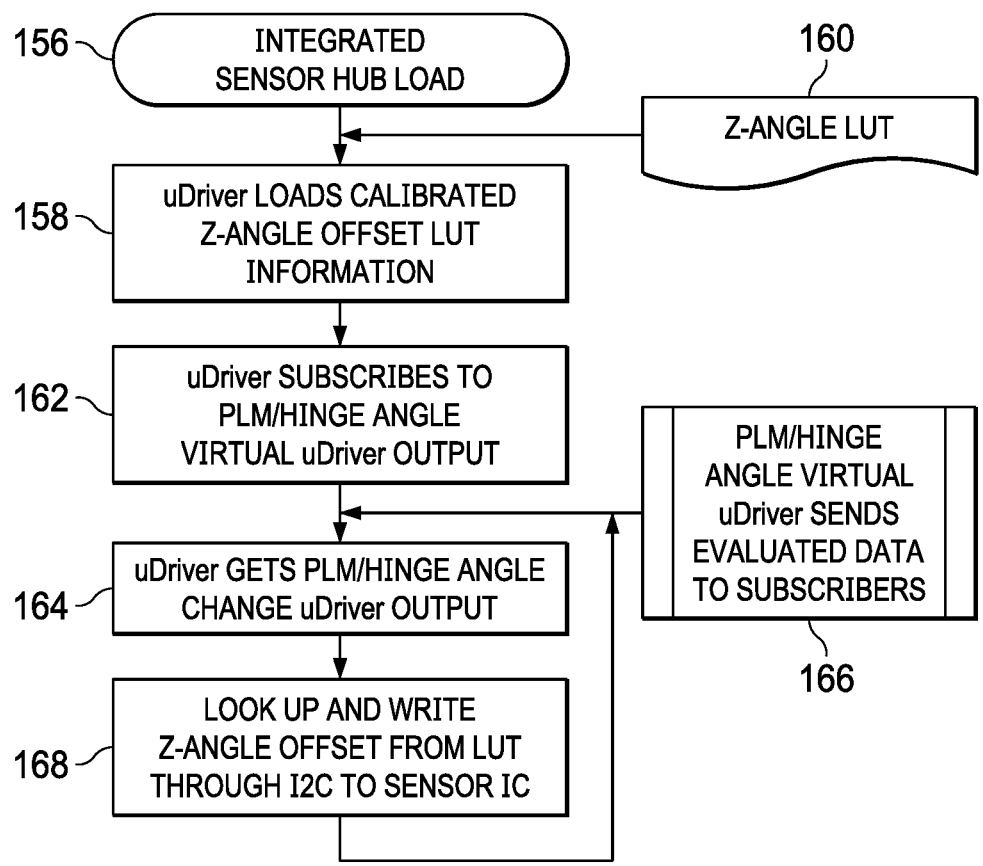
FIG. 11 depicts a flow diagram of a process for adjusting an IR TOF sensor field of view based upon sensed context.

Referring now to FIG. 11, a flow diagram depicts a process for adjusting an IR TOF sensor field of view based upon sensed context. The process starts at step 156 with loading of the integrated sensor hub logic. At step 158, a uDriver loads calibrated angle offset look up table information from an offset angle look up table at step 160. For instance, the look up table includes side and vertical angle offsets associated with housing rotational orientations that keep the IR TOF sensor field of view on an anticipated position of an end user. At step 162, the uDriver subscribes to sensors that provide context for the information handling system, such as hinge rotation angle sensors or accelerometer values that indicate a gravitational vector. At step 164 the uDriver gets the context information from the subscribed sensors, which provide output based upon subscriptions at step 166. At step 168 the angular correction to be applied to IR TOF sensor 34 is looked up from the look up table and applied to direct the field of view towards the anticipated position of the end user. The process then returns to step 164 to continue monitoring context for adjustment of the IR TOF sensor 34 field of view towards the end user's anticipated position.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to execute instructions that process information;
    a memory interfaced with the processor and operable to store the instructions and information;
    a display interfaced with the processor and operable to present the information as visual images;
    an operating system stored in the memory and operable to execute on the processor;
    one or more input devices interfaced with the processor and operable to accept end user inputs for communication to the operating system;
    first and second human proximity detection sensors operable to detect human proximity as a human presence or human absence by a time of flight of infrared light from an infrared emitter reflected back to an infrared sensor; and
    an operating system service executing with the operating system and interfaced with the one or more input devices and the human proximity device, the operating service receiving the human presence and human absence from the first and second human proximity detection sensor and command a human presence or human absence state based upon inputs communicated from the one or more input devices and the human proximity detection sensor human presence and human absence;
    wherein the operating system service applies a first timer expiration for commanding a change between a human present state and a human absent state if both the first and second human proximity detection sensors detect a human presence and a second timer expiration for commanding a change between a human present state and a human absent state if only one of the first and second human proximity detection sensors detect a human presence.

2. The information handling system of claim 1 further comprising:
    a timer interfaced with the operating system service, the operating system service commanding a change from a human present state to a human absent state upon expiration of the timer;
    wherein the operating system service adjusts the timer expiration based at least in part upon inputs detected at the one or more input devices.

3. The information handling system of claim 2 wherein the input detected at the one or more input devices comprises a keyboard touch, the operating system service setting the timer as an inverse proportion to the time passed from a most recent keyboard touch.

4. The information handling system of claim 2 wherein the input detected at the one or more input devices comprises an eye gaze detection, the operating system service setting a first timer expiration if an eye gaze is detected and a second timer expiration if an eye gaze is not detected.

5. The information handling system of claim 2 wherein the input detected at the one or more input devices comprises a touch at a touchpad, the operating system service setting a first timer expiration for a first touch pattern and a second time expiration for a second touch pattern.

6. The information handling system of claim 1 further comprising:
    a housing having first and second portions rotationally coupled by a hinge to rotate about a rotational axis;
    wherein the first human proximity detection sensor integrates in the housing proximate the hinge.

7. The information handling system of claim 6 wherein the display integrates in one of the housing portions, and the first and second human proximity detection sensors are disposed on opposite sides of the display and having first and second fields of view that partially overlap.

8. The information handling system of claim 7 wherein the operating system service further selectively disables one of the first and second human proximity detection sensors based upon an amount of field of view of each of the first and second sensors that detects human presence.

9. A method for managing human absence detection at an information handling system, the method comprising:
    detecting a human presence state and a human absence state with first and second infrared time of flight sensors;
    reporting a change from a human presence state to a human absence state from the infrared time of flight sensor to an operating system;
    delaying application of the human absence state at the information handling system for a predetermined time, the predetermined time varying based upon one or more predetermined conditions; and
    adjusting the predetermined time based upon whether both or only one of the infrared time of flight sensors detect the human presence state.

10. The method of claim 9 further comprising:
    scanning a field of view with each of the first and second infrared time of flight sensor, each field of view having plural portions;
    analyzing the field of view to determine the number of portions having the human presence state; and
    adjusting the predetermined time based upon the number of portions.

11. The method of claim 9 further comprising:
    selecting a high security mode or low security mode at the information handling system;
    if a high security mode is selected, applying at the information handling system a transition from the human absence state to the human presence state only if both the first and second time of flight sensors detect the human presence state; and
    if a low security mode is selected applying at the information handling system a transition from the human absence state to the human presence state if either of the first and second time of flight sensors detect the human presence state.

12. The method of claim 9 further comprising:
    integrating the first infrared time of flight sensor proximate a hinge that rotationally couples first and second housing portions of the information handling system; and
    integrating the second infrared time of flight sensor distal the hinge.

13. The method of claim 9 further comprising:
    integrating the first infrared time of flight sensor in a first housing portion of the information handling system;
    rotationally coupling a second housing portion to the first housing portion;
    monitoring a rotational orientation of the first and second housing portions; and
    adjusting a scan angle or algorithm detection parameters of the first infrared time of flight sensor based at least in part upon the rotational orientation.

14. A method for managing human absence detection at an information handling system, the method comprising:
    detecting a human presence state and a human absence state with an infrared time of flight sensor;

reporting a change between a human presence state and a human absence state from the infrared time of flight sensor to an operating system;

delaying application of the human absence state at the information handling system for a predetermined time, the predetermined time varying based upon one or more predetermined conditions;

storing at the information handling system end user physical dimensions; and applying the end user physical dimensions to vary the predetermined time.

15. A system for managing human absence detection at an information handling system, the system comprising:

a non-transitory memory; and instructions stored on the non-transitory memory, the instructions executable on a processor to:

receive a human absence state or human presence state from an infrared time of flight sensor;

receive one or more indications of end user interactions with the information handling system;

store end user physical dimensions; and apply the one or more indications of end user interactions to determine a timeout, the timeout expiration triggering application of the human absence state or human presence state at the information handling system, the one or more indications of end user interactions including at least the end user physical dimensions.

16. The system of claim 15 wherein the one or more indications of end user interactions include at least accelerations detected by an accelerometer.

17. The system of claim 15 further comprising instructions executable on a processor to:

receive from the infrared time of flight sensor the amount of a scan of the infrared time of flight sensor that includes a human present state; and apply the amount of scan to determine the timeout.

* * * * *